United States Patent [19]

Kelsey

[11] 4,437,892
[45] Mar. 20, 1984

[54] MARINE ANTIFOULING COATING COMPOSITION

[75] Inventor: Jeffrey R. Kelsey, Ashford, England

[73] Assignee: The British Petroleum Company Limited, London, England

[21] Appl. No.: 246,384

[22] Filed: Mar. 23, 1981

[30] Foreign Application Priority Data

Mar. 27, 1980 [GB] United Kingdom ............... 8010350

[51] Int. Cl.$^3$ ............................................. C09D 5/14
[52] U.S. Cl. .................................... 106/15.05; 106/18; 106/18.34; 424/288; 523/122; 524/178; 524/180
[58] Field of Search ................. 106/15.05, 16–18, 106/18.34; 424/288; 528/58; 523/122; 424/178, 424/180

[56] References Cited

U.S. PATENT DOCUMENTS

| | | | |
|---|---|---|---|
| 3,201,360 | 8/1965 | Proops et al. | 528/58 |
| 3,773,729 | 11/1973 | Wakimoto et al. | 528/58 |
| 4,038,304 | 7/1977 | Kazama et al. | 528/58 |
| 4,156,066 | 5/1979 | Gould | 106/15.05 |
| 4,182,829 | 1/1980 | Walkowiak et al. | 528/58 |
| 4,270,953 | 6/1981 | Nakagawa et al. | 428/288 |

*Primary Examiner*—Lorenzo B. Hayes
*Attorney, Agent, or Firm*—Morgan, Finnegan, Pine, Foley & Lee

[57] ABSTRACT

Compositions suitable for forming marine anti-fouling surface coatings comprise a polymer (e.g. maleinized polybutadiene) capable of cross-linking with amines, a hydrocarbyl polyisocyanate and a hydrocarbyl tin oxide or sulphide. The composition is preferably in two packs, which are combined on the surface to be coated, one pack containing the polymer and tin oxide or sulphide, and the other the polyisocyanate. A (thio) carbamate is formed as an intermediate which then hydrolyzes to an amine.

A method of coating surfaces and surface coatings so produced are also claimed.

8 Claims, No Drawings

MARINE ANTIFOULING COATING COMPOSITION

This invention relates to surface coatings suitable for use as marine anti-fouling coatings, to compositions for producing such coatings and to methods for producing such coatings.

Our European Patent Application No. 80302015 proposes a method for cross-linking a functionalised polymer in the presence of organic material comprising reacting a liquid polymer which is miscible with the organic material and which contains functional groups with a cross-linking agent which is also miscible with the organic material and which contains complementary functional groups and allowing a three dimensional polymer network containing encapsulated organic material to form.

It has now been found that the above method can be adapted to produce surface coatings suitable for use as marine anti-fouling coatings.

For surface coatings to be suitable as marine anti-fouling coatings a biocide has to be incorporated in them. Among the most effective marine biocides are the organo-tin compounds of general formula:

$$R_3SnX$$

where R is a hydrocarbyl group with from 1 to 10 carbon atoms and X is an anion. The hydrocarbyl group may be alkyl, e.g. propyl or butyl, or aryl, e.g. phenyl, and X may be oxygen, sulphide, halide or organic acid anions. Trihydrocarbyl tin oxide and sulphide are particularly suitable compounds which are liquids at ambient temperature and hence easy to handle and incorporate into the normally liquid compositions used to form surface coatings.

The biocides act by being gradually released from the coating into the surrounding water. Hence, of anti-fouling coatings are to have a long, effective life, the biocide should be uniformly distributed throughout the coating and be present in a substantial amount. Simple mixing of the biocide with the composition has been found to have limitations with regard to ensuring uniform distribution and including a high proportion of biocide.

The present invention is based on the finding that improved results are obtained if the cross-linking agent chosen is one which reacts reversibly with the biocide.

According to the present invention a composition suitable for forming a marine anti-fouling surface coating comprises a polymer having functional groups capable of reacting with amine groups to give a three dimensional polymer network, a hydrocarbyl polyisocyanate, and a hydrocarbyl tin oxide or sulphide.

Hydrocarbyl polyisocyanates are not cross-linking agents in themselves and would not be a normal choice of compound for reacting with a polymer as defined above. However, isocyanates react readily and rapidly at ambient temperature under anhydrous conditions with hydrocarbyl tin oxides or sulphides to form the corresponding carbamates or thiocarbamates according to the equation:

$$(R_3Sn)_2X + R^1NCO \rightarrow R_3Sn\ XOC\ NR^1\ SnR_3$$

where X is oxygen or sulphur.

The carbamates are reasonable stable under anhydrous conditions but are fairly readily hydrolyzed at ambient temperature in the presence of moisture (even atmospheric moisture) to give amines and release the hydrocarbyl tin oxide or sulphide according to the equation:

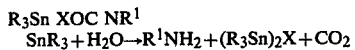
$$R_3Sn\ XOC\ NR^1$$
$$SnR_3 + H_2O \rightarrow R^1NH_2 + (R_3Sn)_2X + CO_2$$

For simplicity, the above equations have been expressed in terms of a single isocyanate group. With polyisocyanates the reactions occur at each isocyanate group.

The amine then cross-links with the polymer to give a three dimensional polymer network and the hydrocarbyl tin oxide or sulphide is incorporated uniformly into the coating as it cures. The $CO_2$ produced diffuses from the coating without any adverse effect.

All the three main components of the composition may be combined to give a single composition which may be applied to a surface in the normal way by spraying or brushing. However, as indicated above, such a composition has to be prepared and stored under anhydrous conditions.

As an alternative the composition may be prepared and stored in two packs which are mixed on the surface to be coated, e.g. by using a two-nozzle mixing head sprayer. One pack contains the isocyanate and the other the polymer and the tin oxide or sulphide. The carbamate is formed rapidly on the surface and is then more slowly hydrolysed to the amine and the tin oxide or sulphide.

The hydrocarbyl polyisocyanate is preferably a tri-isocyanate and the hydrocarbyl group may be alkyl, cycloalkyl or aryl. The size of the hydrocarbyl radical is not critical but may conveniently have from 1 to 10 carbon atoms. Suitable isocyanates may be those commercially available for polyurethane manufacture, e.g. hexamethylene diisocyanate or toluene diisocyanate, either as such or preferably in trimerised form. Examples of suitable isocyanates are the Desmodur range sold by Bayer AG, particularly Desmodur N.

The hydrocarbyl tin oxide and sulphide is also preferably a trihydrocarbyl compound and the hydrocarbyl group may be alkyl (e.g. propyl or butyl), cycloalkyl or aryl (e.g. phenyl) with from 1 to 10 carbon atoms.

The functional groups capable of acting with amine groups on the polymer may be carboxylic acid, anhydride or acid chloride groups. Such groups will react with amine groups at ambient temperatures so that the three dimensional polymer network is formed on the surface to be coated. There should, of course, be at least two functional groups per molecule on both the polymer and the amine cross-linking agent to allow a three dimensional polymer network to form.

The polymer may be any polymer capable of being functionalised as described above. It is preferably a polyolefin and more particularly a polymer of a mono- or di-olefin containing, before functionalisation, at least one and preferably a plurality of pendant vinyl groups.

The polyolefins may be derived in known manner from conjugated dienes such as butadiene, isoprene and chloroprene and mono-olefins such as isobutene and 4-methylpentene-1.

Suitable polymers may also be obtained from linear mono-olefins such as ethylene and/or propylene, acrylates and methacrylates having sufficiently long chains to give oil solubility, and substituted styrenes such as t-butyl styrene.

Polymers derived from naturally occurring substances may also be used, provided they can be functionalised, e.g. linseed or soya bean oil and natural rubber.

The molecular weight of the polymer may vary widely depending on its type and may range from 250 (e.g. linseed oil) to $1 \times 10^6$ or more (e.g. natural rubber) with intermediate values for synthetic polymers (e.g. 5,000 to 20,000 MW for maleinised polybutadiene and 200,000 to 500,000 for maleinised polyisoprene).

The polymers may be functionalised by the incorporation of carboxylic acid, anhydride or acid chloride groups by known techniques. Convenient methods are maleinisation across double bonds in the polymer or copolymerisation with a reactant containing the required functional groups.

The extent of functionalisation will depend on the number of sites (e.g. double bonds) which can readily be functionalised or, in the case of copolymerisation, the proportion of reactants. The extent of functionalisation may thus vary widely depending on the type of polymer and may range from 1% (e.g. natural rubber) to 50% (e.g. linseed oil). Preferably the extent of functionalisation is from 5 to 30% by weight. Other things being equal, anti-fouling performance appears to increase with increasing extent of functionalisation.

There may be residual unsaturation remaining after functionalisation without affecting the formation of a three dimensional network. Preferably however the functionalised polymer is substantially saturated to increase storage life and the functionalised polymer may be hydrogenated, if necessary, to achieve this.

The term "polymer" includes copolymers.

Since the composition may be applied to a surface by conventional techniques of brushing or spraying, it follows that the polymer should be in liquid form, and preferably a liquid with a viscosity of not more than 20 poise at 25° C. It may be a polymer which is itself liquid at ambient temperature or it may be a solution or dispersion of a polymer in a suitable solvent or diluent.

Preferred polymers may thus be maleinised polybutadiene, polyisoprene, EPDM rubber, natural rubber and linseed oil. Maleinised polybutadienes having a molecular weight of from 5,000 to 20,000 are commercially available, e.g. those sold under the trade name 'Lithene' by Revertex Limited.

In a preferred embodiment the composition may contain a minor proportion, with respect to the polymer, of an epoxy compound as an additional cross-linking agent, the epoxy compound acting to increase the toughness of the coating. The epoxy compound may be present in an amount of from 10 to 40% wt based on the weight of functionalised polymer.

Low molecular weight (e.g. a molecular weight of from 350 to 400) epoxy compounds are preferred, typically those with two epoxy groups and a short hydrocarbon chain, since these are available in solventless form and give a relatively slow cure. Medium and high molecular weight epoxy compounds, (e.g. molecular weight of from 400 upwards, particularly 900 to 6,000) tend to give a rapid cure, since they normally contain significant amounts of hydroxyl groups. Examples of suitable low molecular weight epoxy compounds are Epikote 815 and 828 (Shell Chemicals Limited) DER 331 (Dow Corning Limited) and Araldite GY250 (Ciba-Geigy Limited). Suitable medium molecular weight epoxy compounds are Epikote 1001 (Shell Chemicals Limited) and Araldite 6100 (Ciba-Geigy Limited), and a suitable high molecular weight epoxy compound is Epikote OL53 (Shell Chemicals Limited).

If the composition is made and stored in two portions, the epoxy compound is preferably included in the portion containing the functionalised polymer.

Other conventional materials used in surface coatings may be incorporated in the compositions, e.g. pigments, extenders and inert solvents, and these are preferably included in the portion containing the polymer, if a two pack system is used. Other things being equal, anti-fouling performance appears to increase with increasing pigment content up to an optimum of about 50% wt.

It is a feature of the preesent invention that a relatively high proportion of hydrocarbyl tin oxide or sulphide can be uniformly incorporated into the coating because of the three dimensional polymer network formed and because of the compatability of the polymer with the hydrocarbyl tin oxide or sulphide. The amount of hydrocarbyl tin oxide or sulphide may be slightly less than, equal to, or slightly greater than the stoichiometric amount required to react with the isocyanate to form carbamate (e.g. a molar ratio of hydrocarbyl tin oxide or sulphide to isocyanate of from 0.8:1 to 1.3:1, preferably 0.9:1 to 1.2:1).

Additional anti-fouling compounds may be present, if required, other than hydrocarbyl tin oxide or sulphide. For example, cuprous oxide powder may be used as all or part of any pigment present.

The amount of isocyanate will depend on the extent of functionalisation of the polymer and is preferably chosen so that there is a stoichiometric amount of amine with respect to the functional groups.

Having regard to the above considerations, the compositions may have the following proportions of components by weight of dry surface coating:

|  | Broad Range % wt | Preferred Range % wt |
|---|---|---|
| Functionalised polymer | 5 to 55 | 5 to 25 |
| Isocyanate | 2 to 10 | 2 to 9 |
| Hydrocarbyl tin oxide or sulphide | 5 to 35 | 15 to 30 |
| Epoxy compound | 0 to 20 | 1 to 10 |
| Pigment | 0 to 80 | 30 to 70 |

The present invention includes surface coatings whenever produced from compositions as described above or using methods as described above. The present invention also includes methods for forming surface coatings as described above.

The coatings may be applied to any underwater surface either moving or fixed, e.g. ship's hulls or fixed structures such as oil production platforms. It is a particular feature of the coatings that they can, if desired, be applied underwater and will cure underwater.

EXAMPLE 1

160 g of maleinised polybutadiene (15% maleinisation and 9,000 MW) sold under the trade name Lithene N9000 were mixed with 160 g of xylene and stirred until the maleinised polybutadiene had completely dissolved.

The following were then added by simple mixing:
Epoxy resin (Epikote 828XA): 45 g
Tributyl tin oxide: 200 g
Xylene: 300 g
Pigments were added as follows:
Micronised iron oxide ($Fe_2O_3$): 692 g
Microdol Extra: 512 g (Microdol Extra is a micronised talc sold by A/S Norwegian Talc.) Since the pigments were in micronised form they were simply blended in using a homogeniser. (Had they not been micronised they would have had to be milled into the mixture using a ball or bead mill.)

The above blend formed a stable product capable of extended storage.

To form a coating, 54 g of trimerised hexamethylene diisocyanate (Desmodur N) were added with stirring and the resultant mixture applied immediately to a mild steel plate by airless spraying. The coating was allowed to cure in air at ambient temperature and humidity and was touch dry after one hour. (In other experiments curing was found to vary from ½ to 4 hours depending on the relative humidity at the time.)

EXAMPLE 2

240 g of maleinised polybutadiene (10% maleinisation and 8,000 MW) sold under the trade name Lithene LX16 were mixed with 120 g of xylene and stirred until the maleinised polybutadiene was completely dissolved. The following were then added by simple mixing:

Epoxy Resin (DER331): 66 g
Tributyl tin oxide: 235 g 880 g of micronised cuprous oxide were then added in a homogeniser.

When required for application, 64 g of Demodur N were added to the above blend with stirring and the resulting mixture was applied immediately to a mild steel plate by brushing. The coating was allowed to cure in air at ambient temperature and humidity and was touch dry after two hours.

EXAMPLE 3

A two-pack composition was prepared as follows.

| First Pack | |
|---|---|
| Lithene LX16 maleinised polybutadiene (10% maleinisation and 8,000 MW) | 270 g |
| Epikote 815 solventless epoxy resin (epoxy equivalent 190) | 50 g |
| Tributyl tin oxide | 170 g |
| Tioxide RCR2 ex BTP Tioxide Titanium dioxide | 100 g |
| Talc (ex Norwegian talc) | 102 g |
| Barytes (ex Haeffner) | 200 g |
| Xylene solvent | 100 g |
| Ethylethoxy acetate solvent | 50 g |
| Second Pack | |
| Isocyanate (Desmodur L) | 44 g |

The components of the first pack were mixed as follows:

Half of the maleinized polybutadiene was dissolved in the tributyl tin oxide. The rest of the material, including the solvent, were milled in using either a bead or ball mill to give the required fineness of grind to form a stable dispersion.

The second pack was added to the first pack with stirring and applied to a mild steel plate by brushing after allowing the material to stand for 15 minutes. The coating was allowed to cure in air at ambient temperature and humidity and was touch dry after one hour.

EXAMPLE 4

Example 3 was repeated with different ingredients to give a two pack composition as follows.

| First Pack | |
|---|---|
| Linseed oil, 50% maleinised | 476 g |
| Epikote 828XA | 66 g |
| Tributyl tin oxide | 235 g |
| Titanium dioxide | 100 g |
| Barytes | 200 g |
| China clay (Kaolinite) | 93 g |
| Second Pack | |
| Desmodur N | 39 g |

The two packs were mixed and applied to a mild steel plate as for Example 3 to give a touch dry coating after one hour.

EXAMPLE 5

Plates coated according to Examples 1, 2 and 3 were immersed in the sea off the Isle of Wight to test for anti-fouling performance. The results after 5 months immersion (summer months) were as follows.

Example 1—No weed or shell fouling. Small amount of green algae (25% coverage).
Example 2—No weed or shell fouling. Minor amount of green algae (15% coverage).
Example 3—No weed or shell fouling. Complete coverage with green algae.

The lesser amount of algal fouling with the coating of Example 1 (as compared with the coating of Example 3) is attributed to the fact that the Example 1 coating was based on 15% maleinised polybutadiene (as compared with 10% maleinized polybutadiene in Example 3).

The lesser amount of algal fouling with the coating of Example 2 (as compared with the coating of Example 2) is attributed to the presence of cuprous oxide anti-foulant as well as tributyl tin oxide.

I claim:

1. A marine anti-fouling surface coating composition comprising components
    (1) from 5 to 55% wt of a polymer having 1 to 50% by weight of functional groups selected from the group consisting of carboxylic acid, anhydride and acid chloride groups capable of reacting with amine groups to form a three dimensional polymer network,
    (2) from 2 to 10% wt of a hydrocarbyl polyisocyanate which is not, in itself, a cross-linking agent for the polymer of (1) above, wherein the hydrocarbyl group has from one to ten carbon atoms,
    (3) from 5 to 35% wt of a hydrocarbyl tin compound having the formula $R_3SnX$ wherein R is the hydrocarbyl group having from one to ten carbon atoms and X is oxygen or sulfur,
    (4) from 0 to 20% wt of an epoxy compound, and
    (5) from 0 to 80% wt of a pigment, wherein components (1), (2) and (3) interact in use according to the following sequence of reactions
        (a) the hydrocarbyl polyisocyanate and the hydrocarbyl tin compound react to form a carbamate or thiocarbamate,
        (b) the carbamate or thiocarbamate hydrolyses to an amine and the original hydrocarbyl tin compound, and
        (c) the amine and the polymer having functional groups react to give a surface coating.

2. A composition as claimed in claim 1 which is prepared and stored in two packs, one pack containing the polymer and the hydrocarbyl tin compound and the other containing the hydrocarbyl polyisocyanate.

3. A composition as claimed in claim 1 characterised in that there are from 5 to 30% by weight functional groups on the polymer.

4. A composition as claimed in claim 1 characterised in that it contains a minor proportion, with respect to the polymer, of an epoxy compound having a molecular weight of from 350 to 6,000.

5. A composition as claimed in claim 1 comprising:

| | |
|---|---|
| Functionalised polymer | 5–25% wt |
| Hydrocarbyl polyisocyanate | 2–9% wt |
| Hydrocarbyl tin compound | 5–30% wt |
| Epoxy compound having a molecular weight of from 350 to 6,000 | 1–10% wt |
| Pigment | 0–70% wt |

6. A surface coating having marine anti-fouling properties produced from a composition as claimed in claim 1.

7. A method of preparing a surface having marine anti-fouling properties comprising applying to the surface a composition as claimed in claim 1 and allowing the composition to cure in the presence of moisture.

8. A method as claimed in claim 7 wherein the composition is applied and cured underwater.

* * * * *